US012685936B2

(12) United States Patent     (10) Patent No.:   US 12,685,936 B2

Zhang et al.     (45) Date of Patent:     Jul. 21, 2026

(54) SPECIAL EFFECT OPTIMIZATION METHOD AND APPARATUS, STORAGE MEDIUM, AND PROGRAM PRODUCT

(71) Applicant: Huawei Technologies Co., Ltd., Shenzhen (CN)

(72) Inventors: Zhibo Zhang, Nanjing (CN); Ting Li, Nanjing (CN); Liangcheng Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 206 days.

(21) Appl. No.: 18/727,891

(22) PCT Filed: Jan. 9, 2023

(86) PCT No.: PCT/CN2023/071311
§ 371 (c)(1),
(2) Date: Jul. 10, 2024

(87) PCT Pub. No.: WO2023/134625
PCT Pub. Date: Jul. 20, 2023

(65) Prior Publication Data
US 2025/0099851 A1     Mar. 27, 2025

(30) Foreign Application Priority Data
Jan. 11, 2022    (CN) ......................... 202210028509.1

(51) Int. Cl.
    *A63F 13/52*       (2014.01)
    *A63F 13/60*       (2014.01)
    (Continued)

(52) U.S. Cl.
    CPC .............. *A63F 13/52* (2014.09); *A63F 13/60* (2014.09); *G06T 15/04* (2013.01); *G06V 10/761* (2022.01)

(58) Field of Classification Search
    CPC .... A63F 13/52; A63F 13/60; A63F 2300/203;
                A63F 2300/6692; A63F 13/35;
    (Continued)

(56) References Cited

U.S. PATENT DOCUMENTS

| | | | | |
|---|---|---|---|---|
| 2014/0219499 | A1* | 8/2014 | Bregler | G06T 7/251 |
| | | | | 382/103 |
| 2019/0213778 | A1* | 7/2019 | Du | G06T 15/04 |

FOREIGN PATENT DOCUMENTS

| | | | | |
|---|---|---|---|---|
| CA | 2812421 A1 * | 3/2011 | | G06T 1/60 |
| CN | 110689565 A | 1/2020 | | |

(Continued)

OTHER PUBLICATIONS

Jose-Maria Arnau et al., "Eliminating Redundant Fragment Shader Executions on a Mobile GPU via Hardware Memoization," Jun. 14, 2014, XP093249079, total 12 pages.

*Primary Examiner* — Temesghen Ghebretinsae
(74) *Attorney, Agent, or Firm* — Slater Matsil, LLP

(57)          ABSTRACT

In accordance with an embodiment, a method includes obtaining render instructions and identifying a purpose of the render instructions; in response to the render instructions being used to obtain a plurality of image frames and the plurality of image frames comprising special effect textures: selecting two adjacent image frames from the plurality of image frames, and identifying a similarity between special effect textures of the two adjacent image frames; and in response to the similarity meeting a condition, using a special effect texture of a latter image frame in the two adjacent image frames as a special effect texture of a next frame of image of the two adjacent image frames.

19 Claims, 8 Drawing Sheets

(51) Int. Cl.
  *G06T 15/04* (2011.01)
  *G06V 10/74* (2022.01)

(58) Field of Classification Search
  CPC ......... A63F 2300/66; A63F 2300/6646; G06T
    15/04; G06V 10/761; H04N 21/42653;
    H04N 21/4312; H04N 21/4781; H04N
    21/816
  USPC ........................................................ 345/581
  See application file for complete search history.

(56) References Cited

FOREIGN PATENT DOCUMENTS

| CN | 113160244 A | | 7/2021 | | |
|----|-------------|---|--------|---|---|
| CN | 119583845 A | * | 3/2025 | ............. | H04N 21/44 |
| CN | 120219596 A | * | 6/2025 | ............. | G06T 15/04 |
| WO | WO-2020119444 A1 | * | 6/2020 | ........... | G06T 15/005 |

* cited by examiner

FIG. 7a

▼ ▦ Frame 35 183x964 vertices, 401 draws,
  ▸ ▦ RenderPass 0 (Framebuffer 27)
  ▸ ▦ RenderPass 1 (Framebuffer 28)
  ▸ ▦ RenderPass 2 (Framebuffer 27)
  ▸ ▦ RenderPass 3 (Framebuffer 21)
  ▸ ▦ RenderPass 4 (Framebuffer 18)
  ▸ ▦ RenderPass 5 (Framebuffer 9)
  ▸ ▦ RenderPass 6 (Framebuffer 7)
  ▸ ▦ RenderPass 7 (Framebuffer 11)
  ▸ ▦ RenderPass 8 (Framebuffer 21)
  ▸ ▦ RenderPass 9 (Framebuffer 12)
  ▸ ▦ RenderPass 10 (Framebuffer 10)
  ▸ ▦ RenderPass 11 (Framebuffer 21)
  ▸ ▦ RenderPass 12 (Framebuffer 23)
  ▸ ▦ RenderPass 13 (Framebuffer 21)
  ▸ ▦ RenderPass 14 (Framebuffer 26)
  ▸ ▦ RenderPass 15 (Framebuffer 8)
  ▸ ▦ RenderPass 16 (Framebuffer 15)
  ▸ ▦ RenderPass 17 (Framebuffer 13)
  ▸ ▦ RenderPass 18 (Framebuffer 24)
  ▸ ▦ RenderPass 19 (Framebuffer 15)
  ▸ ▦ RenderPass 20 (Framebuffer 3)
  ▸ ▦ RenderPass 21 (Framebuffer 0)

FIG. 7b

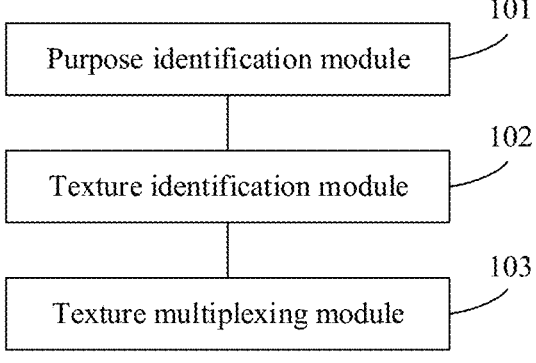

FIG. 8

SPECIAL EFFECT OPTIMIZATION METHOD AND APPARATUS, STORAGE MEDIUM, AND PROGRAM PRODUCT

CROSS-REFERENCED TO RELATED APPLICATIONS

This application is a National Stage of International Application No. PCT/CN2023/071311, filed on Jan. 9, 2023, which claims priority to Chinese Patent Application No. 202210028509.1, filed on Jan. 11, 2022, both of which are hereby incorporated by reference in their entireties.

TECHNICAL FIELD

This application relates to the image processing field, and in particular, to a special effect optimization method and apparatus, a storage medium, and a program product.

BACKGROUND

A game frame rate and game power consumption are always major concerns of game vendors. To present a good game visual effect, in many popular 3D games, such as Genshin Impact, Honkai Impact 3rd, and NBA2019, when each frame of image to be displayed in a game is rendered, a plurality of render passes are usually set to render special effect textures such as shadow (shadow) and bloom (bloom), and then each frame of image is obtained based on the special effect textures. When an object in images does not move or moves slightly, setting a plurality of render passes for each frame of image consumes a large amount of memory bandwidth and a small amount of processor load. Consequently, game power consumption increases, a game frame rate decreases, and user game experience is affected.

SUMMARY

In view of this, this application provides a special effect optimization method and apparatus, a storage medium, and a program product. According to the special effect optimization method in embodiments of this application, when an object in images does not move or moves slightly, an image frame rate of a game can be increased and game power consumption can be reduced when special effect-related rendering is performed on each frame of image.

According to a first aspect, an embodiment of this application provides a special effect optimization method. The method includes: obtaining render instructions and identifying a purpose of the render instructions; when the render instructions are used to obtain a plurality of frames of images and the plurality of frames of images include special effect textures, selecting two adjacent frames of images from the plurality of frames of images, and identifying a similarity between special effect textures of the two adjacent frames of images; and when it is determined that the similarity meets a condition, using a special effect texture of a latter frame of image in the two adjacent frames of images as a special effect texture of a next frame of image of the two adjacent frames of images.

According to the special effect optimization method in this embodiment of this application, the render instructions are obtained and the purpose of the render instructions is identified, so that whether the render instructions are used to obtain the plurality of frames of images and whether the plurality of frames of images include special effect textures may be determined. That is, whether the render instructions are used to render a special effect scene may be identified and determined. When the render instructions are used to obtain the plurality of frames of images and the plurality of frames of images include special effect textures, two adjacent frames of images in the plurality of frames of images are selected, and the similarity between the special effect textures of the two adjacent frames of images is identified, so that the similarity between the special effect textures may be determined by comparison when the render instructions are used to render a special effect scene. When it is determined that the similarity meets the condition, the special effect texture of the latter frame of image in the two adjacent frames of images is used as the special effect texture of the next frame of image of the two adjacent frames of images, so that the special effect texture of the next frame of image of the two adjacent frames of images can also be obtained without using a conventional render pass manner. This avoids memory occupation and processor load consumption caused when the special effect texture is generated in the conventional render pass manner. The memory occupation and the processor load consumption are reduced, so that an image frame rate of a game can be increased and game power consumption can be reduced during special effect image rendering.

If a running frame rate of the game does not reach a maximum frame rate of a terminal device, by using the special effect optimization method in this application, the running frame rate of the game can be effectively increased, and game power consumption may be reduced. If the running frame rate of the game reaches the maximum frame rate of the terminal device, by using the special effect optimization method in this application, the game power consumption can be effectively reduced, thereby effectively prolonging duration of continuously running the game on the terminal device at the maximum frame rate of the terminal device.

According to the first aspect, in a first possible implementation of the special effect optimization method, the obtaining render instructions and identifying a purpose of the render instructions includes: intercepting the render instructions from an application; for each instruction in the render instructions, analyzing at least one of a parameter of the instruction, a type of the instruction, and semantics of an instruction segment in which the instruction is located; and determining the purpose of the render instructions based on a result of the analysis.

In this manner, it may be determined whether the render instructions are instructions used to obtain the plurality of frames of images and whether the plurality of frames of images include special effect textures, so that whether the render instructions are used to render a special effect scene is determined, and identification of the special effect scene is completed. In addition, the render instructions include a plurality of types of data that can be used for analyzing and determining the purpose of the render instructions, so that flexibility of a manner of determining the purpose of the render instructions can be improved.

According to the first aspect or the first possible implementation of the first aspect, in a second possible implementation of the special effect optimization method, the identifying a similarity between special effect textures of the two adjacent frames of images includes: determining a value of a grayscale difference between the special effect textures of the two adjacent frames of images by comparison; and determining a value of the similarity between the special effect textures of the two adjacent frames of images based on the grayscale difference value.

The grayscale value of the special effect texture is easy to obtain. In this manner, an implementation of determining the similarity between the special effect textures of the two adjacent frames of images is simpler, and efficiency of the special effect optimization method is higher.

According to the second possible implementation of the first aspect, in a third possible implementation of the special effect optimization method, the condition includes: the value of the similarity between the special effect textures of the two adjacent frames of images is less than a first threshold.

The condition that the value of the similarity between the special effect textures of the two adjacent frames of images is less than the first threshold is set, so that when the similarity meets the condition, it can be determined that an object in the images does not move or has a low motion amplitude. Therefore, the special effect texture of the latter frame of image in the two adjacent frames of images is used as the special effect texture of the next frame of image of the two adjacent frames of images, which has little impact on accuracy of the next frame of image of the two adjacent frames of images and ensures quality of image rendering.

According to the first aspect or any one of the foregoing possible implementations of the first aspect, in a fourth possible implementation of the special effect optimization method, the selecting two adjacent frames of images from the plurality of frames of images includes: selecting the first two frames of images from the plurality of frames of images as the two adjacent frames of images.

In this manner, there are more images that can implement special effect texture multiplexing in the plurality of frames of images, and effects of improving an image frame rate of a game and reducing device power consumption by using the special effect optimization method can be further improved.

According to the first aspect or any one of the foregoing possible implementations of the first aspect, in a fifth possible implementation of the special effect optimization method, when it is determined that the similarity meets the condition, the method further includes: sampling the special effect texture of the latter frame of image in the two adjacent frames of images to a frame buffer, where in the frame buffer, the special effect texture of the latter frame of image in the two adjacent frames of images and a main scene texture of the next frame of image of the two adjacent frames of images are used for rendering to obtain the next frame of image of the two adjacent frames of images.

In this manner, when the special effect texture of the next frame of image of the two adjacent frames of images is obtained without using the render pass, rendering of the next frame of image of the two adjacent frames of images may be completed. In this way, the next frame of image of the two adjacent frames of images can be normally displayed, and user game experience is not affected.

According to the first aspect or any one of the foregoing possible implementations of the first aspect, in a sixth possible implementation of the special effect optimization method, when it is determined that the similarity meets the condition, the method further includes: intercepting a render instruction that is in the render instructions and that is used to create a render pass to obtain the special effect texture of the next frame of image of the two adjacent frames of images, so that the intercepted instruction is not transferred to an execution object of the render instructions.

In this manner, a quantity of render passes created in a process of rendering a plurality of frames of images can be reduced, and an effect of reducing memory bandwidth is achieved. In addition, submission of a draw call that is repeated, not required, and slightly different and that is related to obtaining of a special effect texture can be skipped, and an effect of reducing processor load is achieved.

According to the first aspect or any one of the foregoing possible implementations of the first aspect, in a seventh possible implementation of the special effect optimization method, when it is determined that the similarity does not meet the condition, the method further includes: repeatedly performing the step of selecting two adjacent frames of images from the plurality of frames of images and the subsequent steps; and when the step of selecting two adjacent frames of images from the plurality of frames of images is repeatedly performed, the latter frame of image in the two adjacent frames of images that are previously selected and the next frame of image of the two adjacent frames of images are used as newly selected two adjacent frames of images.

In this manner, when the similarity does not meet the condition, it may be determined that the object in the images has a large motion amplitude, and comparison of a special effect texture similarity of subsequent images may continue to be performed until it is determined that the object in the images does not move or moves slightly when the similarity meets the condition, and then the special effect texture multiplexing is performed, thereby further ensuring quality of image rendering.

According to the first aspect or any one of the foregoing possible implementations of the first aspect, in an eighth possible implementation of the special effect optimization method, the special effect texture includes at least one of a bloom special effect texture and a shadow special effect texture.

According to a second aspect, an embodiment of this application provides a special effect optimization apparatus. The apparatus includes: a purpose identification module, configured to obtain render instructions and identify a purpose of the render instructions; a texture identification module, configured to: when the render instructions are used to obtain a plurality of frames of images and the plurality of frames of images include special effect textures, select two adjacent frames of images from the plurality of frames of images, and identify a similarity between special effect textures of the two adjacent frames of images; and a texture multiplexing module, configured to: when it is determined that the similarity meets a condition, use a special effect texture of a latter frame of image in the two adjacent frames of images as a special effect texture of a next frame of image of the two adjacent frames of images.

According to the second aspect, in a first possible implementation of the special effect optimization apparatus, the obtaining render instructions and identifying a purpose of the render instructions includes: intercepting the render instructions from an application; for each instruction in the render instructions, analyzing at least one of a parameter of the instruction, a type of the instruction, and semantics of an instruction segment in which the instruction is located; and determining the purpose of the render instructions based on a result of the analysis.

According to the second aspect or the first possible implementation of the second aspect, in a second possible implementation of the special effect optimization apparatus, the identifying a similarity between special effect textures of the two adjacent frames of images includes: determining a value of a grayscale difference between the special effect textures of the two adjacent frames of images by comparison; and determining a value of the similarity between the special effect textures of the two adjacent frames of images based on the grayscale difference value.

According to the second possible implementation of the second aspect, in a third possible implementation of the special effect optimization apparatus, the condition includes: the value of the similarity between the special effect textures of the two adjacent frames of images is less than a first threshold.

According to the second aspect or any one of the foregoing possible implementations of the second aspect, in a fourth possible implementation of the special effect optimization apparatus, the selecting two adjacent frames of images from the plurality of frames of images includes: selecting the first two frames of images from the plurality of frames of images as the two adjacent frames of images.

According to the second aspect or any one of the foregoing possible implementations of the second aspect, in a fifth possible implementation of the special effect optimization apparatus, when it is determined that the similarity meets the condition, the apparatus further includes: a sampling module, configured to sample the special effect texture of the latter frame of image in the two adjacent frames of images to a frame buffer, where in the frame buffer, the special effect texture of the latter frame of image in the two adjacent frames of images and a main scene texture of the next frame of image of the two adjacent frames of images are used for rendering to obtain the next frame of image of the two adjacent frames of images.

According to the second aspect or any one of the foregoing possible implementations of the second aspect, in a sixth possible implementation of the special effect optimization apparatus, when it is determined that the similarity meets the condition, the apparatus further includes: an instruction interception module, configured to intercept a render instruction that is in the render instructions and that is used to create a render pass to obtain the special effect texture of the next frame of image of the two adjacent frames of images, so that the intercepted instruction is not transferred to an execution object of the render instructions.

According to the second aspect or any one of the foregoing possible implementations of the second aspect, in a seventh possible implementation of the special effect optimization apparatus, when it is determined that the similarity does not meet the condition, the apparatus repeatedly performs functions of the texture identification module and subsequent modules. When the texture identification module repeatedly performs the step of selecting two adjacent frames of images from the plurality of frames of images, the latter frame of image in the two adjacent frames of images that are previously selected and the next frame of image of the two adjacent frames of images are used as newly selected two adjacent frames of images.

According to the second aspect or any one of the foregoing possible implementations of the second aspect, in an eighth possible implementation of the special effect optimization apparatus, the special effect texture includes at least one of a bloom special effect texture and a shadow special effect texture.

According to a third aspect, an embodiment of this application provides a special effect optimization apparatus, including a processor and a memory configured to store instructions executable by the processor. The processor is configured to implement the special effect optimization method according to one or more of the first aspect or the possible implementations of the first aspect when executing the instructions.

According to a fourth aspect, an embodiment of this application provides a non-volatile computer-readable storage medium. The non-volatile computer-readable storage medium stores computer program instructions, and when the computer program instructions are executed by a processor, the special effect optimization method according to one or more of the first aspect or the possible implementations of the first aspect is implemented.

According to a fifth aspect, an embodiment of this application provides a computer program product. The computer program product includes computer-readable code or a non-volatile computer-readable storage medium carrying computer-readable code. When the computer-readable code is run in an electronic device, a processor in the electronic device performs the special effect optimization method according to one or more of the first aspect or the possible implementations of the first aspect.

These aspects and other aspects of this application are more concise and more comprehensive in descriptions of the following (a plurality of) embodiments.

BRIEF DESCRIPTION OF THE DRAWINGS

The accompanying drawings included in this specification and constituting a part of this specification and this specification jointly show example embodiments, features, and aspects of this application, and are intended to explain the principles of this application.

FIG. 7a is a diagram of a render pass created when an $(N+2)^{th}$ frame of image is obtained according to the conventional technology 1;

FIG. 7b is a diagram of a render pass created when an $(N+2)^{th}$ frame of image is obtained according to an embodiment of this application;

FIG. 8 is a diagram of an example structure of a special effect optimization apparatus according to an embodiment of this application.

DETAILED DESCRIPTION OF ILLUSTRATIVE EMBODIMENTS

The following describes various example embodiments, features, and aspects of this application in detail with reference to the accompanying drawings. Identical reference signs in the accompanying drawings indicate elements that have same or similar functions. Although various aspects of embodiments are shown in the accompanying drawings, unless otherwise particularly specified, the accompanying drawings do not need to be drawn to scale.

The specific term "example" herein means "used as an example, embodiment or illustration". Any embodiment described as an "example" herein is not necessarily explained as being superior or better than other embodiments.

In addition, to better describe this application, numerous specific details are given in the following specific implementations. A person skilled in the art should understand that this application can also be implemented without some specific details. In some embodiments, methods, means, elements and circuits that are well-known to a person skilled in the art are not described in detail, so that the subject matter of this application is highlighted.

The following explains terms in this specification.

Bloom (Bloom): A computer graphics effect used for video games, demonstrations, and high dynamic range rendering to reproduce imaging of a camera in real-world.

Shadow (Shadow): A shadow effect used in game rendering.

Render pass (render pass): describes a rendering process by specifying information about frame buffer attachment used during rendering.

Frame rate (frame rate): a frequency (rate) at which images in a unit of frame continuously appear on a display.

Draw call (draw call): relates to instruction invoking of the render pass.

The following describes an image rendering method in the conventional technology.

Figure 1:
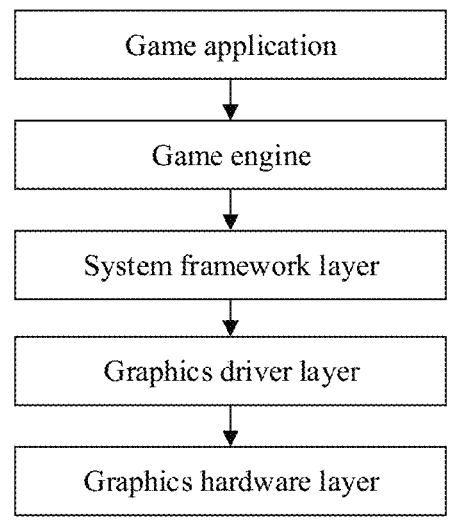
FIG. 1 is a diagram of an architecture of a game system according to a conventional technology 1.

FIG. 1 is a diagram of an architecture of a game system according to a conventional technology 1.

As shown in FIG. 1, the game system in the conventional technology 1 mainly includes the following parts: a game application (Application), a game engine (Game Engine, and common game engines are Unity, Unreal, and the like), a system framework (Framework) layer, a graphics driver layer (driver development kit, DDK), and a graphics hardware layer (graphics processing unit, GPU) that executes a render instruction. A user performs an operation by using the game application, and the game system performs image rendering in response to the operation of the user. First, when the user performs an operation by using the game application, the game application may deliver an OpenGL render instruction to the system framework layer. The system framework layer intercepts the OpenGL render instruction, establishes a connection with a local window system, and continues to transfer the OpenGL render instruction to the graphics driver development kit layer. The graphics driver development kit layer processes the OpenGL render instruction to obtain an instruction that can be executed by the graphics hardware layer, and finally submits the processed instruction to the graphics hardware layer for execution.

Figure 2:
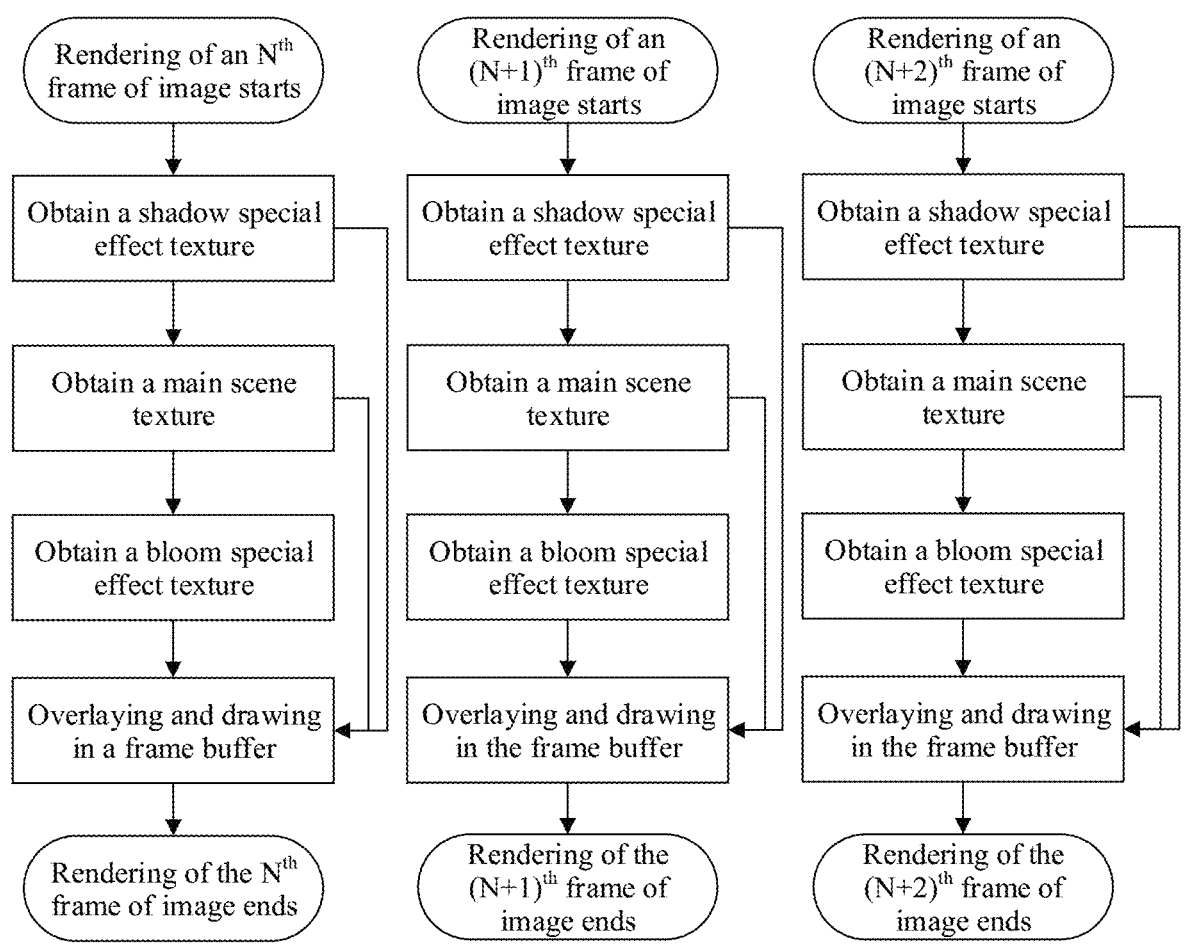
FIG. 2 is a schematic flowchart of an image rendering method according to the conventional technology 1.

Currently, to ensure a perfect game scene effect, most game vendors render a large quantity of repeated special effects such as shadows and/or blooms in a rendering process of each frame of image. FIG. 2 is a schematic flowchart of an image rendering method according to the conventional technology 1.

As shown in FIG. 2, shadow and bloom special effect rendering is used as an example. If an OpenGL render instruction indicates to perform special effect rendering starting from an $N^{th}$ frame, when rendering an $N^{th}$ frame of image, the game system first obtains a shadow special effect texture of the $N^{th}$ frame of image, then obtains a main scene texture (which may also be referred to as a non-special effect texture) of the $N^{th}$ frame of image, and then obtains a bloom special effect texture of the $N^{th}$ frame of image. Finally, the shadow special effect texture, the bloom special effect texture, and the main scene texture of the $N^{th}$ frame of image are separately sampled to a frame buffer, and are overlaid and drawn in the frame buffer. Then, the graphics hardware layer displays the image overlaid and drawn in the frame buffer. Then, the game system may sequentially perform image rendering of an $(N+1)^{th}$ frame, an $(N+2)^{th}$ frame, and the like, and a manner is the same as that of performing image rendering of the $N^{th}$ frame.

Figure 3A:
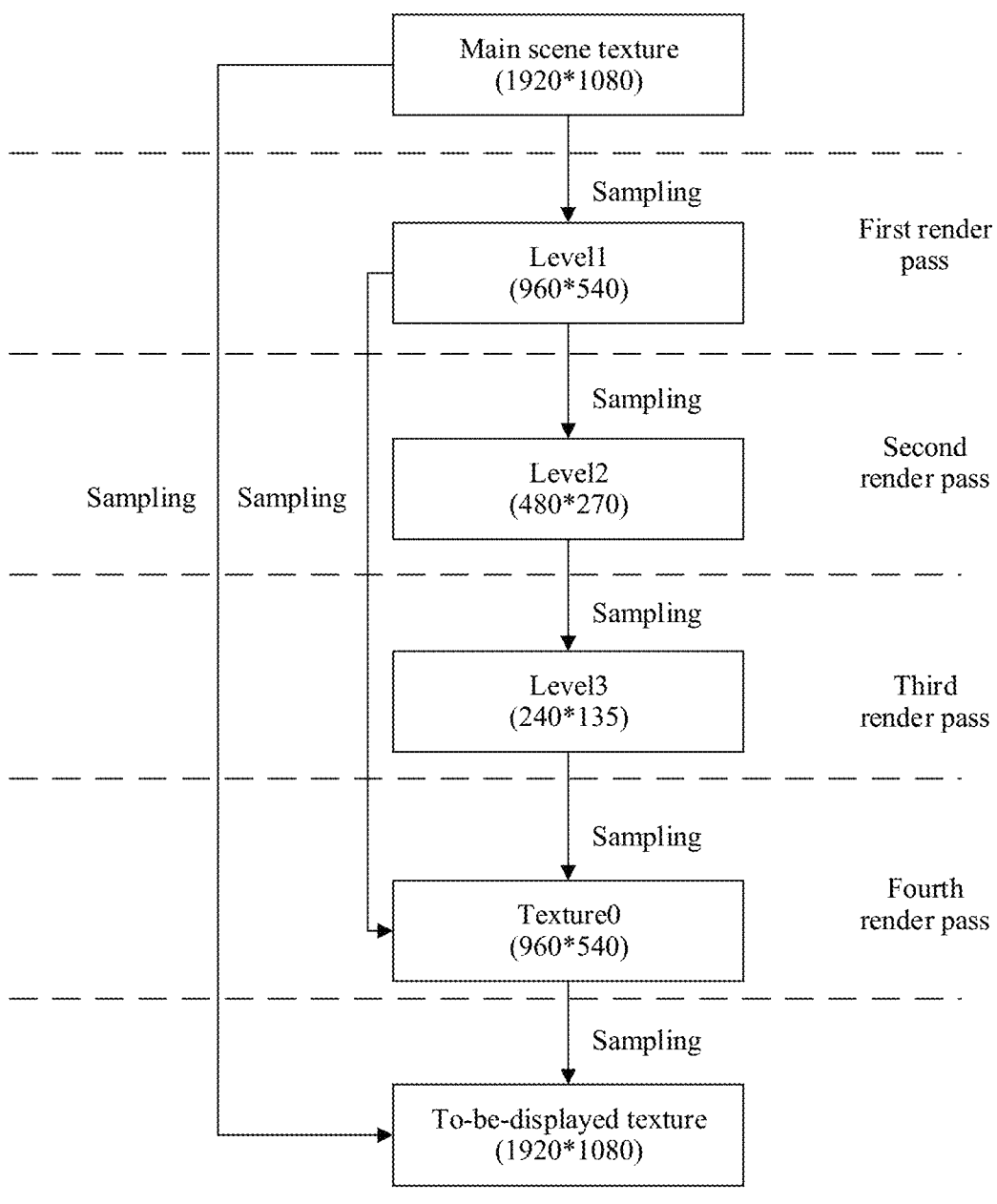
FIG. 3a is a diagram of a render pass created when a bloom special effect texture is obtained according to the conventional technology 1.
Figure 3B:
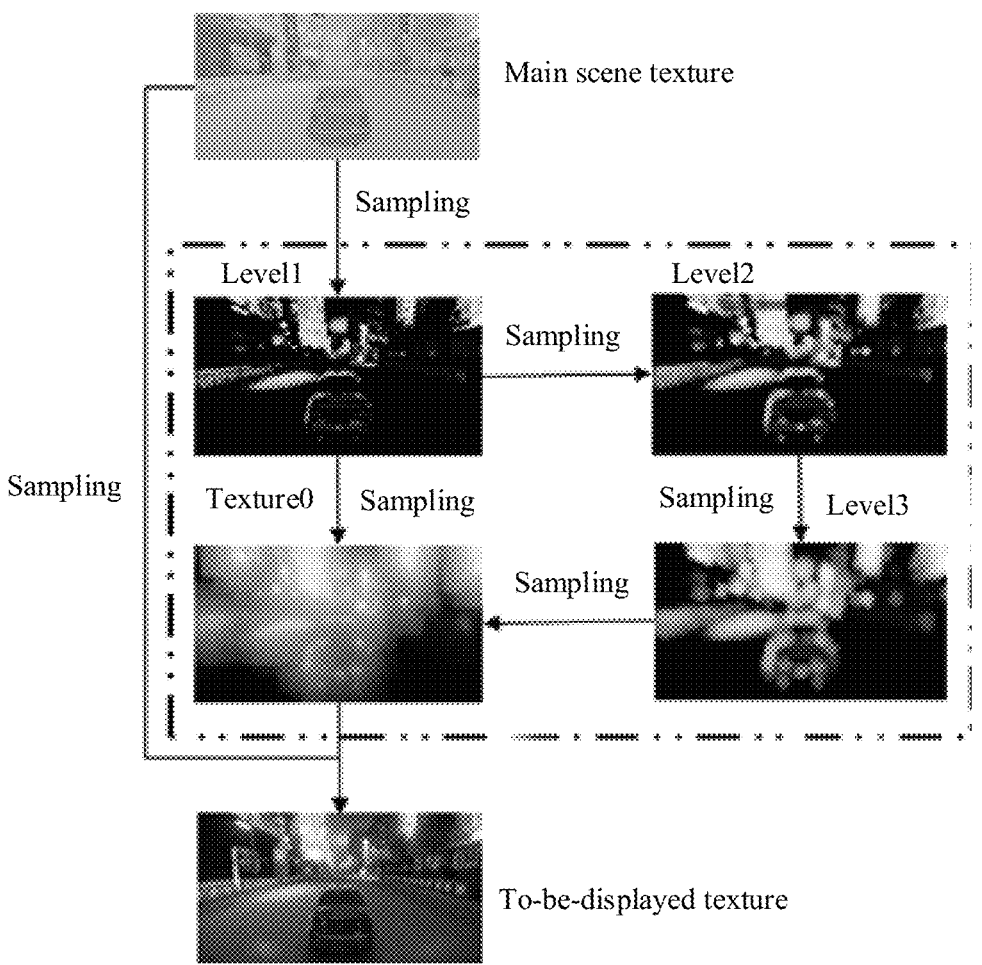
FIG. 3b is a diagram of a render pass created when a bloom special effect texture is obtained according to the conventional technology 1.

In a process of obtaining the shadow special effect texture of each frame of image and the bloom special effect texture of each frame of image, a plurality of render passes need to be created. FIG. 3a and FIG. 3b are respectively diagrams of render passes created when a bloom special effect texture is obtained according to the conventional technology 1.

As shown in FIG. 3a, to add a bloom special effect to an image obtained through rendering, the game system creates four render passes to generate a bloom special effect texture. In an example in FIG. 3a, the bloom special effect texture is obtained based on the main scene texture, and a resolution of the main scene texture may be 1920×1080. In the first render pass, the main scene texture is sampled to obtain a first intermediate texture Level1. A resolution of the first intermediate texture Level1 may be 960*540. In the second render pass, the first intermediate texture Level1 is sampled to obtain a second intermediate texture Level2. A resolution of the second intermediate texture Level2 may be 480*270. In the third render pass, the second intermediate texture Level2 is sampled to obtain a third intermediate texture Level3. A resolution of the third intermediate texture Level3 may be 240*135. That is, resolutions of textures obtained by every two adjacent render passes in the first to third render passes are in a relationship of ½. In the fourth render pass, mixed sampling is performed on the first intermediate texture Level1 and the third intermediate texture Level3, to obtain a bloom special effect texture texture0. A resolution of the bloom special effect texture texture0 may be 960*540, and is the same as the resolution of the first intermediate texture Level1. The bloom special effect texture texture0 and the main scene texture may be separately sampled to the frame buffer. When the bloom special effect texture texture0 and the main scene texture are overlaid and drawn in the frame buffer, a to-be-displayed texture whose resolution is equal to the main scene texture resolution 1920*1080 is obtained, and the to-be-displayed texture is displayed by the graphics hardware layer. The main scene texture, each intermediate special effect texture, and the to-be-displayed texture are shown in FIG. 3b.

However, the image rendering solution in the conventional technology 1 has the following disadvantages: An increase in a quantity of render passes greatly consumes memory bandwidth of an electronic device running a game system. In addition, in a case in which an object in images does not move or moves slightly, in a rendering process of each frame of image, drawing of special effect textures with a small difference is repeated, and a specific quantity of draw calls (for example, sampling instructions in FIG. 3a) need to be invoked. This consumes load of some processors (such as a central processing unit CPU and a graphics processing unit GPU) of the electronic device. The foregoing disadvantages finally cause problems such as a decrease in an image frame rate of a game and an increase in game power consumption, and directly affect user game experience.

In view of this, this application provides a special effect optimization method and apparatus, a storage medium, and a program product. According to the special effect optimization method in embodiments of this application, when an object in images does not move or moves slightly, an image frame rate of a game can be increased and game power consumption can be reduced when special effect-related rendering is performed on each frame of image.

The following describes an example application scenario of the special effect optimization method in embodiments of this application.

Figure 4:
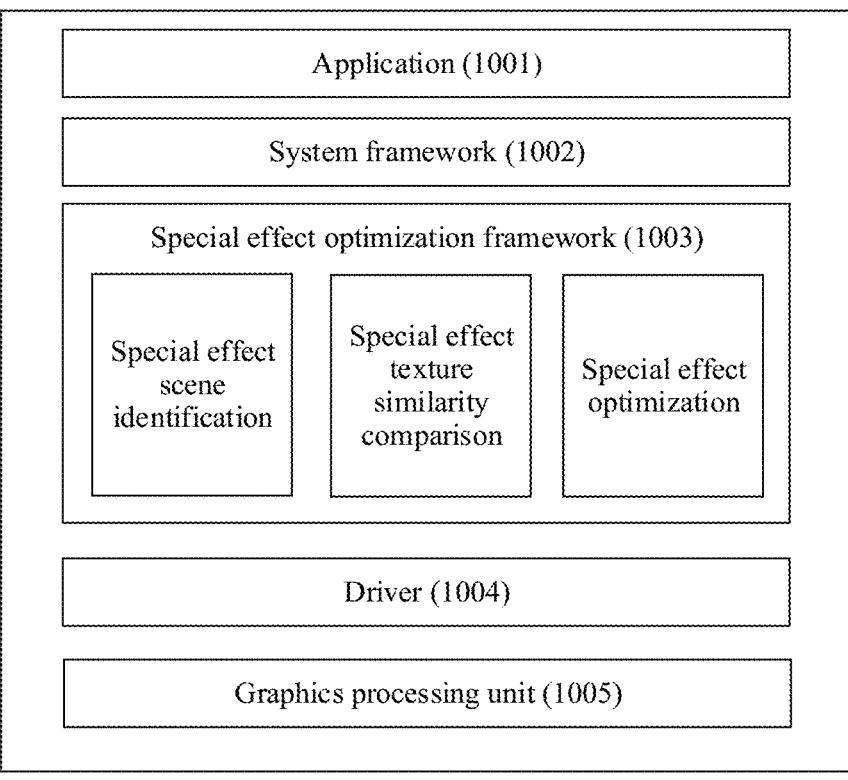
FIG. 4 is a diagram of an example architecture of a game system according to an embodiment of this application.

The special effect optimization method in embodiments of this application may be applied to a game system. The game system may be disposed on a terminal device. For example, the terminal device in this application may be a smartphone, a netbook, a tablet computer, a notebook computer, a TV, a virtual reality device, or the like. FIG. 4 is a diagram of an example architecture of a game system according to an embodiment of this application.

As shown in FIG. 4, the system architecture of this application includes an application 1001, a system framework 1002, a special effect optimization framework 1003, a driver 1004, and a graphics processing unit 1005.

The application 1001 may be implemented based on the conventional technology, and may include a to-be-optimized game application or another application. The application 1001 may use an OpenGL or an OpenGL ES rendering graphics application programming interface (application programming interface, API). The application 1001 may generate a corresponding render instruction based on an operation performed by a user on the application 1001.

The system framework 1002 may be implemented based on the conventional technology, may be a framework structure based on an Android operating system and framework code of the Android operating system, and may be configured to intercept the render instruction generated by the application 1001.

The special effect optimization framework 1003 is mainly configured to perform the special effect optimization method in embodiments of this application, and is mainly used for special effect scene identification, special effect texture similarity comparison, and special effect optimization, to implement multiplexing of special effects such as bloom and shadow in some scenes. For an example implementation of the method, refer to the following related descriptions in FIG. 5 and FIG. 6.

The driver 1004 may be implemented based on the conventional technology, and may include a driver of a rendering graphics application programming interface such as OpenGL/OpenGL ES/Vulkan.

The graphics processing unit 1005 may be implemented based on the conventional technology, and may include a specific hardware graphics processing unit GPU and the like on the terminal device, and is configured to complete a specific rendering task.

Figure 5:
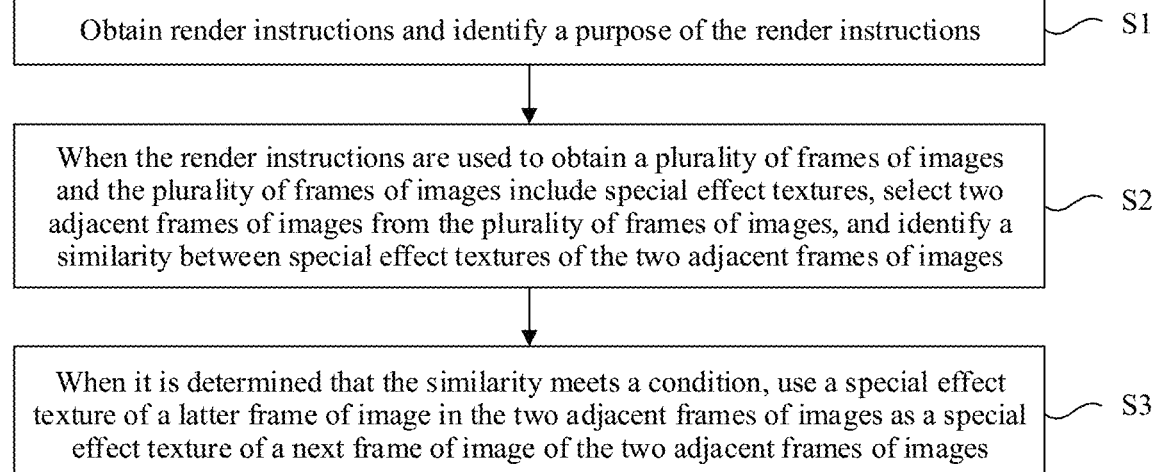
FIG. 5 is a schematic flowchart of an example of a special effect optimization method according to an embodiment of this application.

FIG. 5 is a schematic flowchart of an example of a special effect optimization method according to an embodiment of this application.

As shown in FIG. 5, in a possible implementation, this application provides a special effect optimization method. The method includes the following steps.

S1: Obtain render instructions and identify a purpose of the render instructions.

The render instructions may be render instructions that are intercepted by the system framework 1002 and that are generated by the application 1001. The purpose of the render instructions may indicate whether the render instructions are used to obtain a plurality of frames of images and whether the plurality of frames of images include special effect textures. Optionally, a specific special effect texture (for example, a shadow special effect texture or a bloom special effect texture) included in the plurality of frames of images may be further indicated. A person skilled in the art should understand that the render instructions may have more purposes. A purpose of the render instructions that can be identified in step S1 is not limited in this application.

S2: When the render instructions are used to obtain a plurality of frames of images and the plurality of frames of images include special effect textures, select two adjacent frames of images from the plurality of frames of images, and identify a similarity between special effect textures of the two adjacent frames of images.

The plurality of frames of images that include special effect textures and that are obtained by using the render instructions may be a plurality of consecutive frames of images, or may be a plurality of inconsecutive frames of images. This is not limited in this application. Two adjacent frames of images in the plurality of frames of images may be selected based on a time sequence of the plurality of frames of images, for example, selected from two earliest frames of images, or selected from two frames of images at a preset position in the plurality of frames of images, provided that a special effect texture of a next frame of image of the selected two adjacent frames of images is not obtained during selection. A manner of selecting the two adjacent frames of images is not limited in this application.

S3: When it is determined that the similarity meets a condition, use a special effect texture of a latter frame of image in the two adjacent frames of images as a special effect texture of a next frame of image of the two adjacent frames of images.

When the similarity meets the condition, it may be considered that an object in the two adjacent frames of images moves slightly. In this case, it may be considered that an object in the next frame of image of the two adjacent frames of images also moves slightly. Even if the special effect texture of the next frame of image of the two adjacent frames of images is generated by using a render pass, a difference between the special effect texture of the latter frame of image in the two adjacent frames of images and the special effect texture of the next frame of image of the two adjacent frames of images may be very small. Therefore, the special effect texture of the next frame of image of the two adjacent frames of images does not need to be generated by using the render pass, and the special effect texture of the latter frame of image in the two adjacent frames of images may be directly used.

Correspondingly, when the similarity does not meet the condition, it may be considered that an object in the two adjacent frames of images has a large motion amplitude. In this case, it may be considered that an object in the next frame of image of the two adjacent frames of images also has a large motion amplitude, and the special effect texture of the next frame of image of the two adjacent frames of images may be generated by using the render pass.

According to the special effect optimization method in this embodiment of this application, the render instructions are obtained and the purpose of the render instructions is identified, so that whether the render instructions are used to obtain the plurality of frames of images and whether the plurality of frames of images include special effect textures may be determined. That is, whether the render instructions are used to render a special effect scene may be identified and determined. When the render instructions are used to obtain the plurality of frames of images and the plurality of frames of images include special effect textures, two adjacent frames of images in the plurality of frames of images are selected, and the similarity between the special effect textures of the two adjacent frames of images is identified, so that the similarity between the special effect textures may be determined by comparison when the render instructions are used to render a special effect scene. When it is determined that the similarity meets the condition, the special effect texture of the latter frame of image in the two adjacent frames of images is used as the special effect texture of the next frame of image of the two adjacent frames of images, so that the special effect texture of the next frame of image of the two adjacent frames of images can be obtained without using a conventional render pass manner. This avoids memory occupation and processor load consumption caused when the special effect texture is generated in the conventional render pass manner. The memory occupation and the processor load consumption are reduced, so that an image frame rate of a game can be increased and game power consumption can be reduced during special effect image rendering.

If a running frame rate of the game does not reach a maximum frame rate of a terminal device, by using the special effect optimization method in this application, the running frame rate of the game can be effectively increased, and game power consumption may be reduced. If the running frame rate of the game reaches the maximum frame rate of the terminal device, by using the special effect optimization method in this application, the game power consumption can be effectively reduced, thereby effectively prolonging duration of continuously running the game on the terminal device at the maximum frame rate of the terminal device.

In a possible implementation, the special effect texture includes at least one of a bloom special effect texture and a shadow special effect texture.

The bloom special effect and the shadow special effect are common special effects used by a game image. Therefore, the special effect optimization method in this embodiment of this application mainly optimizes manners of obtaining the two special effect textures. A person skilled in the art should understand that special effect textures supported by the special effect optimization method in this embodiment of this application should not be limited thereto, provided that a special effect texture used by a game image or another image falls within an optimization range supported by the special effect optimization method in this embodiment of this application. This is not limited in this application.

The following separately describes example implementations of step S1, step S2, and step S3.

In a possible implementation, step S1 includes:

intercepting the render instructions from an application;

for each instruction in the render instructions, analyzing at least one of a parameter of the instruction, a type of the instruction, and semantics of an instruction segment in which the instruction is located; and determining the purpose of the render instructions based on a result of the analysis.

In this manner, it may be determined whether the render instructions are instructions used to obtain the plurality of frames of images and whether the plurality of frames of images include special effect textures, so that whether the render instructions are used to render a special effect scene is determined, and identification of the special effect scene is completed. In addition, the render instructions include a plurality of types of data that can be used for analyzing and determining the purpose of the render instructions, so that flexibility of a manner of determining the purpose of the render instructions can be improved.

For example, the intercepted render instructions from the application may include an OpenGL render instruction, an OpenGL ES render instruction, a Vulkan render instruction, and the like. For an example of work completed by executing the render instructions, refer to work completed in each render pass in FIG. 3a and related descriptions.

For example, if an $N^{th}$ frame of image and subsequent images obtained by the game system through rendering are images including a shadow special effect and a bloom special effect, when the game system renders the $N^{th}$ frame of image, semantics of a generated render instruction may be first creating a plurality of render passes to obtain a shadow special effect texture, then sequentially creating a plurality of render passes based on game logic to obtain a main scene texture (which may also be referred to as a non-special effect texture) and a bloom special effect texture, and finally sampling the shadow special effect texture, the main scene texture, and the bloom special effect texture to a frame buffer, and the $N^{th}$ frame of image is drawn in the frame buffer. Before step S2 and step S3 are performed, for the $(N+1)^{th}$ frame of image and subsequent images, a rendering process operation of the game system may be the same as that of the $N^{th}$ frame, that is, the shadow special effect texture, the main scene texture, and the bloom special effect texture are sequentially drawn based on the game logic, and finally sampled to the frame buffer, and a complete image is drawn in the frame buffer.

For each instruction in the intercepted render instructions, a purpose of each instruction may be determined by analyzing at least one of a parameter of the instruction, a type of the instruction, and semantics of an instruction segment in which the instruction is located. The parameter of the instruction may indicate a resolution of a texture obtained in the render pass. The type of the instruction may indicate an object involved when the instruction is executed, for example, a specific first intermediate texture, a specific second intermediate texture, a specific third intermediate texture and a specific first intermediate texture, or the like. The semantics of the instruction segment in which the instruction is located may indicate a render pass in which a sampling process is completed when the current instruction segment is executed. A process of obtaining the bloom special effect texture is used as an example. Usually, the bloom special effect texture is implemented by sequentially sampling textures of several resolutions in proportion. Each render pass may correspond to one sampling. Therefore, the bloom special effect texture may be identified based on a resolution size. In other words, if an analysis result is that a relationship between resolutions of a plurality of textures indicated by a plurality of instructions in the render instructions meets a rule of bloom special effect textures (after being sorted based on resolution sizes, resolutions of every two adjacent textures are in a same proportion), it may be determined that a purpose of the render instructions is to obtain a plurality of frames of images, and the plurality of frames of images include bloom special effect textures.

Herein, an example in which an analysis result is obtained by analyzing a parameter of the render instructions, to determine a purpose of the render instructions is used. A person skilled in the art should understand that the purpose of the render instructions may also be determined by analyzing a type of the render instructions or analyzing semantics of the render instructions, provided that whether an analysis result meets a rule of a special effect texture can be determined by analyzing the render instructions. A specific implementation of determining the purpose of the render instructions is not limited in this application.

In a possible implementation, in step S2, the selecting two adjacent frames of images from the plurality of frames of images includes:

selecting the first two frames of images from the plurality of frames of images as the two adjacent frames of images.

In this manner, there are more images that can implement special effect texture multiplexing in the plurality of frames of images, and effects of improving an image frame rate of a game and reducing device power consumption by using the special effect optimization method can be further improved.

For example, in step S2, an objective of selecting two adjacent frames of images in the plurality of frames of images is to identify a similarity between special effect textures of the two adjacent frames of images. Further, in step S3, when the similarity meets the condition, a special effect texture of a latter frame of image in the two adjacent frames of images is used as a special effect texture of a next frame of image of the two adjacent frames of images, so that the special effect texture of the next frame of image of the two adjacent frames of images does not need to be obtained by using a render pass. Therefore, if the special effect texture of the next frame of image of the selected two adjacent frames of images has been obtained through the render pass, performing of step S2 and step S3 has no effect on reduction of power consumption and memory of the game system. Based on this, a condition for selecting the two adjacent frames of images may be that the game system has not obtained a special effect texture of a next frame of image of the two adjacent frames of images. On this basis, when the special effect optimization method in this embodiment of this application starts to be performed, the first two frames of images (for example, an $N^{th}$ frame of image and an $(N+1)^{th}$ frame of image) in the plurality of frames of images are selected as two adjacent frames of images. In this case, the third frame of image (for example, the $(N+2)^{th}$ frame of image) and subsequent images in the plurality of frames of images have a chance to obtain corresponding special effect textures without using the render pass. This manner greatly improves an effect of the special effect optimization method. To be specific, the power consumption and memory of the game system are reduced, and the frame rate is greatly improved.

A person skilled in the art should understand that, in step S2, selecting two adjacent frames of images from the plurality of frames of images may also be selecting two frames of images at a preset position from the plurality of frames of images, for example, the $(N+5)^{th}$ frame and the $(N+6)^{th}$ frame of images. In this manner, data processing costs required for performing the special effect optimization method in this embodiment of this application are low. A manner of selecting two adjacent frames of images in step S2 is not limited in this application.

In a possible implementation, in step S2, the identifying a similarity between special effect textures of the two adjacent frames of images includes:

determining a value of a grayscale difference between the special effect textures of the two adjacent frames of images by comparison; and determining a value of the similarity between the special effect textures of the two adjacent frames of images based on the grayscale difference value.

The grayscale value of the special effect texture is easy to obtain. In this manner, an implementation of determining the similarity between the special effect textures of the two adjacent frames of images is simpler, and efficiency of the special effect optimization method is higher.

For example, it is assumed that the first two frames of images (for example, the $N^{th}$ frame of image and the $(N+1)^{th}$ frame of image) in the plurality of frames of images are selected as two adjacent frames of images, and in step S2, a similarity between a special effect texture of the $N^{th}$ frame of image and a special effect texture of the $(N+1)^{th}$ frame of image needs to be identified. The special effect textures that can be compared and identified may be special effect textures of a same type. For example, the special effect textures are all shadow special effect textures or the special effect textures are all bloom special effect textures. An example manner of determining the similarity is to perform Y-diff detection on a Y component value (that is, a grayscale value) of the special effect texture of the $N^{th}$ frame of image and a Y component value (that is, a grayscale value) of the special effect texture of the $(N+1)^{th}$ frame of image. The Y-diff detection may be implemented based on the conventional technology. A result of the Y-diff detection is a grayscale difference value between the special effect texture of the $N^{th}$ frame of image and the special effect texture of the $(N+1)^{th}$ frame of image. The grayscale difference value may be used as a similarity value between the special effect texture of the $N^{th}$ frame of image and the special effect texture of the $(N+1)^{th}$ frame of image, and is used to determine whether the special effect texture of the $(N+1)^{th}$ frame of image can be multiplexed by a latter frame of image of the $(N+1)^{th}$ frame of image. In this case, a smaller similarity value indicates a greater similarity between the special effect texture of the $N^{th}$ frame of image and the special effect texture of the $(N+1)^{th}$ frame of image.

In a possible implementation, the condition includes:

the value of the similarity between the special effect textures of the two adjacent frames of images is less than a first threshold.

The condition that the value of the similarity between the special effect textures of the two adjacent frames of images is less than the first threshold is set, so that when the similarity meets the condition, it can be determined that an object in the images does not move or has a low motion amplitude. Therefore, the special effect texture of the latter frame of image in the two adjacent frames of images is used as the special effect texture of the next frame of image of the two adjacent frames of images, which has little impact on accuracy of the next frame of image of the two adjacent frames of images and ensures quality of image rendering.

It can be learned from the foregoing description that, when the grayscale difference value is used as the similarity value between the special effect textures of the two adjacent frames of images, a smaller similarity value indicates a greater similarity between the special effect textures of the two adjacent frames of images. Therefore, the first threshold may be preset. In this way, that the similarity value is less than the first threshold is considered as the condition in step S3. In this case, a similarity between the special effect textures of the two adjacent frames of images indicated by a similarity value that meets the condition is large. It may be considered that an object in the two adjacent frames of images and the next frame of images of the two adjacent frames of images moves slightly, and the special effect texture of the latter frame of image (for example, an $(N+1)^{th}$ frame of image) in the two adjacent frames of images may be used as the special effect texture of the next frame of image (for example, an $(N+2)^{th}$ frame of image) of the two adjacent frames of images. In other words, the special effect texture of the latter frame of image in the two adjacent frames of images is multiplexed by the next frame of image of the two adjacent frames of images. When there are more than two types of special effect textures, each type of special effect texture of the latter frame of image in the two adjacent frames of images may be separately multiplexed by the next frame of image of the two adjacent frames of images.

A person skilled in the art should understand that the similarity value may also be obtained in another manner, for example, a similarity between two textures is detected in a manner such as a neural network. This is not limited in this application. It should be noted that, if a smaller similarity value indicates a greater similarity between two frames of textures, that a similarity value between the special effect textures of the two adjacent frames of images is less than a first threshold may be set as the condition in step S3. Otherwise, if a smaller similarity value indicates a smaller similarity between two frames of textures, that a similarity value between the special effect textures of the two adjacent frames of images is greater than a second threshold may be set as the condition in step S3. A specific manner of setting the condition may be adjusted based on a relationship between a similarity value and a similarity. This is not limited in this application. The first threshold (or the second threshold) may be preset based on a hardware condition of the terminal device and a user requirement. Selection of a specific value of the first threshold (or the second threshold) is not limited in this application.

In a possible implementation, when it is determined that the similarity meets the condition, the method further includes:

sampling the special effect texture of the latter frame of image in the two adjacent frames of images to a frame buffer, where in the frame buffer, the special effect texture of the latter frame of image in the two adjacent frames of images and a main scene texture of the next frame of image of the two adjacent frames of images are used for rendering to obtain the next frame of image of the two adjacent frames of images.

In this manner, when the special effect texture of the next frame of image of the two adjacent frames of images is obtained without using the render pass, rendering of the next frame of image of the two adjacent frames of images may be completed. In this way, the next frame of image of the two adjacent frames of images can be normally displayed, and user game experience is not affected.

For example, it can be known from the foregoing description that, the special effect texture corresponding to each frame of image is sampled to the frame buffer, and is overlaid and drawn with the main scene texture corresponding to the frame of image on the frame buffer, to finally obtain the frame of image that can be displayed on a display. When the similarity meets the condition, the special effect texture of the latter frame of image (for example, the $(N+1)^{th}$ frame of image) in the two adjacent frames of images is used as the special effect texture of the next frame of image (for example, the $(N+2)^{th}$ frame of image) of the two adjacent frames of images. Therefore, when the special effect texture corresponding to the next frame of image (for example, the $(N+2)^{th}$ frame of image) of the two adjacent frames of images is sampled to the frame buffer, the special effect texture of the latter frame of image (for example, the $(N+1)^{th}$ frame of image) in the two adjacent frames of images may be sampled to the frame buffer. In the frame buffer, the special effect texture of the next frame of image (for example, the $(N+2)^{th}$ frame of image) of the two adjacent frames of images and the main scene texture corresponding to the frame of image may be overlaid and drawn. The special effect texture of the latter frame of image (for example, the $(N+1)^{th}$ frame of image) in the two adjacent frames of images and the main scene texture of the next frame of image (for example, the $(N+2)^{th}$ frame of image) of the two adjacent frames of images may be overlaid and drawn, and the next frame of image (for example, the $(N+2)^{th}$ frame of image) of the two adjacent frames of images is obtained through rendering.

In a possible implementation, when it is determined that the similarity meets the condition, the method further includes:

intercepting a render instruction that is in the render instructions and that is used to create a render pass to obtain the special effect texture of the next frame of image of the two adjacent frames of images, so that the intercepted instruction is not transferred to an execution object of the render instructions.

In this manner, a quantity of render passes created in a process of rendering a plurality of frames of images can be reduced, and an effect of reducing memory bandwidth is achieved. In addition, submission of a draw call that is repeated, not required, and slightly different and that is related to obtaining of a special effect texture can be skipped, and an effect of reducing processor load is achieved.

For example, it can be learned from the foregoing description that, when the similarity meets the condition, the special effect texture of the latter frame of image (for example, the $(N+1)^{th}$ frame of image) in the two adjacent frames of images may be directly used as the special effect texture of the next frame of image (for example, the $(N+2)^{th}$ frame of image) of the two adjacent frames of images, and the special effect texture is sampled to the frame buffer to obtain the next frame of image (for example, the $(N+2)^{th}$ frame of image) of the two adjacent frames of images together with the main scene texture of the next frame of image (for example, the $(N+2)^{th}$ frame of image) of the two adjacent frames of images. Therefore, in the original render instruction, a render instruction used to create a render pass to obtain the special effect texture of the next frame of image (for example, the $(N+2)^{th}$ frame of image) of the two adjacent frames of images through rendering may not need to be executed. In this case, some instructions may be intercepted, so that the instructions are not transferred to an execution object (a graphics processing unit in this embodiment of this application) of the render instruction. Correspondingly, a draw call corresponding to the part of instructions does not need to be submitted to an execution object (a graphics processing unit and a central processing unit in this embodiment of this application) of the render instruction. In a system architecture layer, when the $(N+2)^{th}$ frame of image is rendered, render instructions used to create a render pass to obtain the special effect texture of the $(N+2)^{th}$ frame of image are captured at the special effect optimization framework layer and are all skipped. In other words, a step of creating and switching a render pass related to the special effect texture of the $(N+2)^{th}$ frame of image is omitted.

When the similarity meets the condition, the special effect texture of the latter frame of image (for example, the $(N+1)^{th}$ frame of image) in the two adjacent frames of images is directly used as the special effect texture of the next frame of image (for example, the $(N+2)^{th}$ frame of image) of the two adjacent frames of images, which is equivalent to completing one time of special effect texture multiplexing. For an image after the $(N+2)^{th}$ frame, more times of special effect texture multiplexing may be completed by selecting two adjacent frames of images, identifying a similarity between special effect textures, and determining whether the similarity meets the condition. Similarity identification is implemented by performing Y-diff detection on grayscale values of the special effect textures of the two adjacent frames of images, and the special effect texture of the $(N+1)^{th}$ frame of image and the special effect texture of the $(N+2)^{th}$ frame of image are the same. In other words, Y-diff detection results of the special effect textures of the $(N+1)^{th}$ frame of image and the $(N+2)^{th}$ frame of image are always 0. Therefore, it is meaningless to select the $(N+1)^{th}$ frame of image and the $(N+2)^{th}$ frame of image as the two adjacent frames of images when the similarity meets the condition. Therefore, optionally, the condition for selecting the two adjacent frames of images may further include: the special effect texture of the at least one frame of image in the selected two adjacent frames of images is obtained through the render pass. For example, when two adjacent frames of images continue to be selected, an $(N+2)^{th}$ frame of image and an $(N+3)^{th}$ frame of image (a special effect texture of the $(N+2)^{th}$ frame of image is obtained by multiplexing, and a special effect texture of the $(N+3)^{th}$ frame of image is obtained through a render pass) may be selected as the two adjacent frames of images, and then a similarity between the special effect texture of the $(N+2)^{th}$ frame of image and the special effect texture of the $(N+3)^{th}$ frame of image is identified, and whether the similarity meets the condition is determined. By analogy, after each time the special effect texture multiplexing is completed, selection of two adjacent frames of images, identification of a similarity of special effect textures, and whether the similarity meets the condition may be determined accordingly, thereby implementing a plurality of times of multiplexing of the special effect textures of a plurality of frames of images.

In a possible implementation, when it is determined that the similarity does not meet the condition, the method further includes:

repeatedly performing the step of selecting two adjacent frames of images from the plurality of frames of images and the subsequent steps; and when the step of selecting two adjacent frames of images from the plurality of frames of images is repeatedly performed, the latter frame of image in the two adjacent frames of images that are previously selected and the next frame of image of the two adjacent frames of images are used as newly selected two adjacent frames of images.

In this manner, when the similarity does not meet the condition, it may be determined that an object in the images has a large motion amplitude, and comparison of a special effect texture similarity of subsequent images may continue to be performed until it is determined that the object in the images does not move or moves slightly when the similarity meets the condition, and then the special effect texture multiplexing is performed, thereby further ensuring quality of image rendering.

For example, a similarity is determined in a Y-diff detection manner, and the condition in step S3 is that a similarity value of special effect textures of two adjacent frames of images is less than a first threshold. If a result of the Y-diff detection is that the similarity value is greater than or equal to the first threshold, the similarity does not meet the condition, and it may be considered that objects in the two adjacent frames of images and a next frame of image of the two adjacent frames of images may have a large motion amplitude, a render pass manner in the conventional technology may continue to be used to obtain the next frame of image of the two adjacent frames of images. In this case, in the render instructions, a render instruction used to create a render pass to obtain a special effect texture of the next frame of image of the two adjacent frames of images is still transferred to an execution object of the render instructions. In this way, accuracy of the special effect texture of the next frame of image of the two adjacent frames of images obtained by the game system is ensured.

In this case, selecting the two adjacent frames of images from the plurality of frames of images and subsequent steps may be repeatedly performed. That is, step S2 and step S3 are repeatedly performed. When the step of selecting two adjacent frames of images from the plurality of frames of images is repeatedly performed, the latter frame of image in the two adjacent frames of images that are previously selected and the next frame of image of the two adjacent frames of images are used as newly selected two adjacent frames of images. The reason is that after step S2, namely, selecting two adjacent frames of images (for example, the $N^{th}$ frame of image and the $(N+1)^{th}$ frame of image), is performed previously, the similarity does not meet the condition, so that the next frame of image (for example, the $(N+2)^{th}$ frame of image) of the two adjacent frames of images is obtained through a manner in the conventional technology. In this case, an image that has not been obtained by the game system is updated to the $(N+3)^{th}$ frame image, namely, a next frame of image of the $(N+1)^{th}$ frame image and the $(N+2)^{th}$ frame image. According to the foregoing selection condition of the two adjacent frames of images (the special effect texture of the next frame of image of the selected two adjacent frames of images is not obtained), the newly selected two adjacent frames of images may include the latter frame of image (for example, the $(N+1)^{th}$ frame of image) in the two adjacent frames of images and the next frame of image (for example, the $(N+2)^{th}$ frame of image) of the two adjacent frames of images selected previously. For a manner of repeatedly performing step S2 and step S3, refer to the foregoing description. Details are not described herein again.

Figure 6:
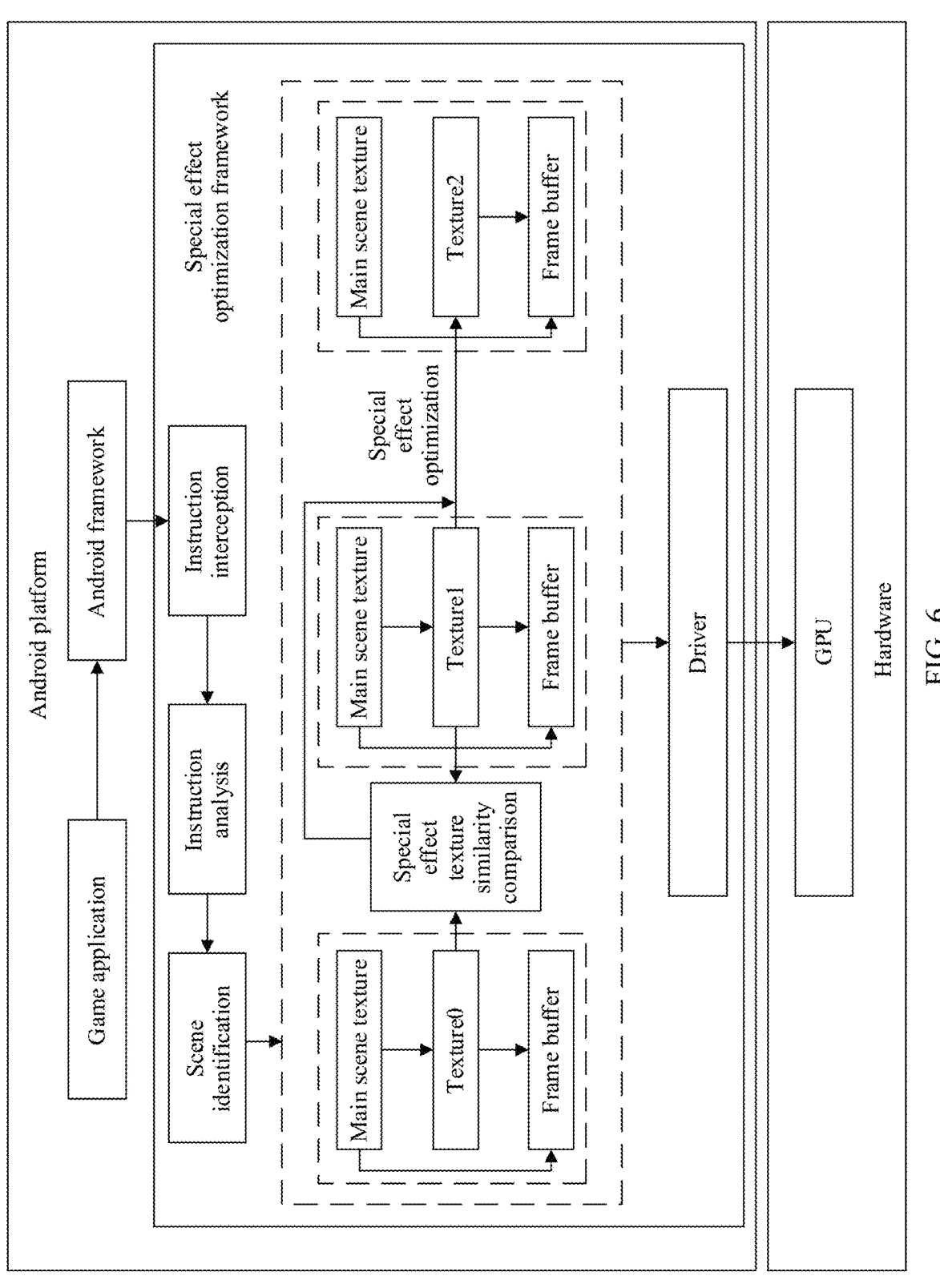
FIG. 6 shows an application example of a special effect optimization method according to an embodiment of this application.

FIG. 6 shows an application example of a special effect optimization method according to an embodiment of this application.

As shown in FIG. 6, in a game system, an application (1001) may be a game application in an Android platform, and correspondingly, a system framework (1002) may be an Android framework. After loading the Android framework and a special effect optimization framework, the game application first performs step S1, to complete obtaining of render instructions (namely, instruction interception) and identification of a purpose of the render instructions (namely, instruction analysis and scene identification). It is assumed that in the example in FIG. 6, a rendering procedure corresponding to the obtained render instructions is shown in FIG. 3a, and resolution proportional sampling is performed through four render passes, to finally obtain a bloom special effect texture. In this case, step S1 may be performed, for example, a render scene of a special effect image is identified by using a resolution indicated by a parameter of the render instructions. In other words, the render instructions are used to obtain a plurality of frames of images, and the plurality of frames of images include special effect textures.

If the render instructions indicate to perform special effect rendering starting from the $N^{th}$ frame, the render instructions are used to obtain a plurality of frames of images, and the plurality of frames of images include special effect textures, when the render instructions start to be executed, the game system may first obtain the $N^{th}$ frame of image and the $(N+1)^{th}$ frame of image in a render pass manner, and temporarily does not obtain the $(N+2)^{th}$ frame of image in a render pass manner. In this case, step S2 is performed, and the $N^{th}$ frame of image and the $(N+1)^{th}$ frame of image may be selected as two adjacent frames of images in the plurality of frames of images, and a similarity between special effect textures of the two adjacent frames of images is identified (namely, special effect similarity comparison). Special effect textures of the two adjacent frames of images, namely, the $N^{th}$ frame of image and the $(N+1)^{th}$ frame of image, may be separately obtained in a process of obtaining the $N^{th}$ frame of image and the $(N+1)^{th}$ frame of image by rendering through a render pass. A manner of special effect similarity comparison may be Y-diff detection, and a result of the Y-diff detection is used as a similarity value. For example, a bloom special effect texture of the $N^{th}$ frame of image is texture 1, and a bloom special effect texture of the $(N+1)^{th}$ frame of image is texture 2. A difference value between a Y component (namely, a grayscale value) of the texture 1 and a Y component (namely, a grayscale value) of the texture 2 is obtained through Y-diff detection, and is used as a similarity value.

After the similarity between the special effect textures of the two adjacent frames of images, namely, the $N^{th}$ frame of image and the $(N+1)^{th}$ frame of image, is identified, step S3 may be performed. When the similarity meets the condition, for example, when the similarity value is less than the first threshold, a render instruction and a related draw call that are originally used to obtain the bloom special effect texture of the $(N+2)^{th}$ frame of image are skipped, and the special effect texture of the latter frame of image, namely, the $(N+1)^{th}$ frame of image, in the two adjacent frames of images, is used as the special effect texture of the next frame of image, namely, an $(N+2)^{th}$ frame of image, of two adjacent frames of images (namely, special effect optimization). Otherwise, the special effect texture of the $(N+2)^{th}$ frame of image is still obtained in a render pass manner. The special effect texture of the $(N+2)^{th}$ frame of image is sampled to the frame buffer, and is overlaid and drawn with the main scene texture sampled to the frame buffer to complete rendering of the $(N+2)^{th}$ frame of image.

When the similarity does not meet the condition, selecting two adjacent frames of images from the plurality of frames of images and subsequent steps are re-performed, for example, selecting the $(N+1)^{th}$ frame of image and the $(N+2)^{th}$ frame of image as the newly selected two adjacent frames of images, and special effect similarity comparison and special effect optimization are performed on the newly selected two adjacent frames of images (that is, step S2 and step S3 are repeatedly performed).

After the special effect optimization is completed, the driver (corresponding to the driver 1004 in FIG. 4) is invoked to convert the render instructions into hardware GPU instructions, and the hardware GPU instructions are submitted to the GPU (corresponding to the graphics processing unit 1005 in FIG. 4), and the GPU completes a rendering task.

Figure 7A:
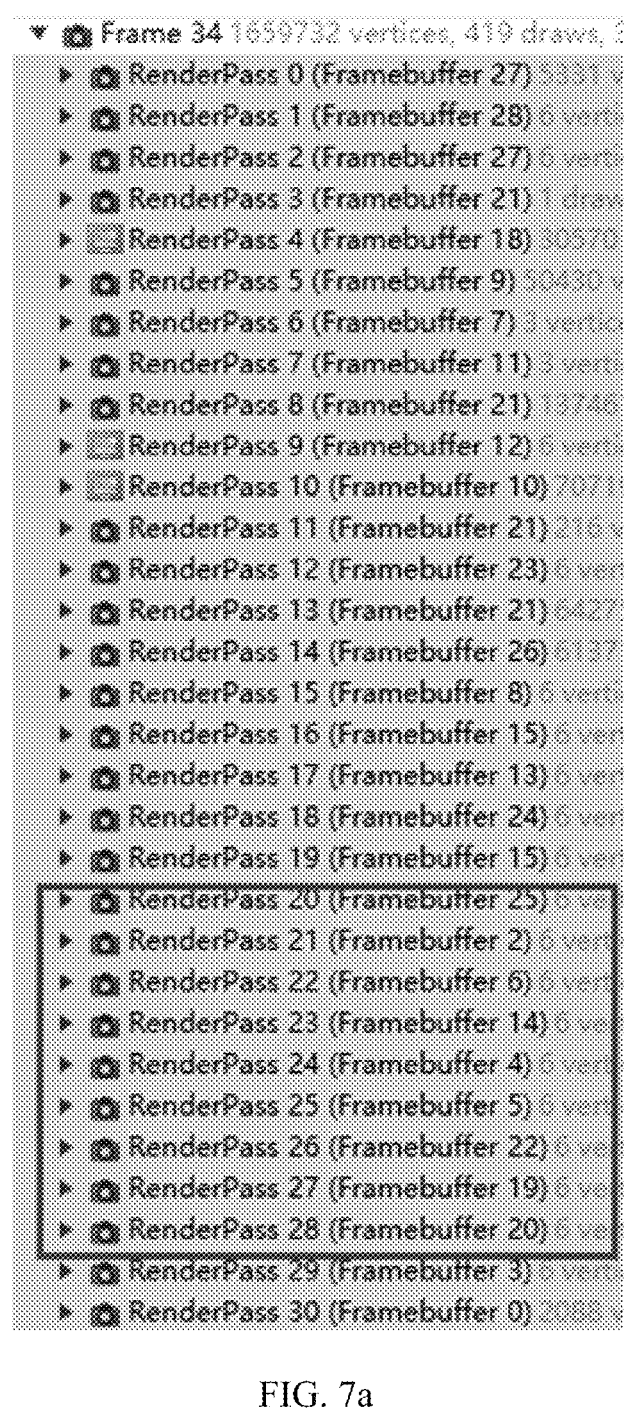

FIG. 7a and FIG. 7b are respectively diagrams of a render pass created when an $(N+2)^{th}$ frame of image is obtained according to the conventional technology 1 and an embodiment of this application.

It can be learned from FIG. 7a and FIG. 7b that, compared with the solution in the conventional technology 1, a quantity of render passes can be reduced in the special effect optimization method in this embodiment of this application (a reduced part is, for example, a render pass in a block in FIG. 7a). Therefore, according to the special effect optimization method in this embodiment of this application, memory bandwidth consumption can be greatly reduced in a scenario with heavy memory load, and submission of some draw calls of frames of images and render instructions used to create a render pass to obtain a special effect texture can be skipped, thereby reducing processor load, improving game performance, and reducing power consumption of a system on chip. According to a test, in high-definition image quality of some games, benefits of the special effect optimization method in this embodiment of this application in different game scenes are increasing a game frame rate by about 3 to 5 frames, and reducing game power consumption by about 30 to 80 mA.

FIG. 8 is a diagram of an example structure of a special effect optimization apparatus according to an embodiment of this application.

As shown in FIG. 8, this application provides a special effect optimization apparatus. The apparatus includes:

a purpose identification module 101, configured to obtain render instructions and identify a purpose of the render instructions;

a texture identification module 102, configured to: when the render instructions are used to obtain a plurality of frames of images and the plurality of frames of images include special effect textures, select two adjacent frames of images from the plurality of frames of images, and identify a similarity between special effect textures of the two adjacent frames of images; and a texture multiplexing module 103, configured to: when it is determined that the similarity meets a condition, use a special effect texture of a latter frame of image in the two adjacent frames of images as a special effect texture of a next frame of image of the two adjacent frames of images.

In a possible implementation, the obtaining render instructions and identifying a purpose of the render instructions includes: intercepting the render instructions from an application; for each instruction in the render instructions, analyzing at least one of a parameter of the instruction, a type of the instruction, and semantics of an instruction segment in which the instruction is located; and determining the purpose of the render instructions based on a result of the analysis.

In a possible implementation, the identifying a similarity between special effect textures of the two adjacent frames of images includes: determining a value of a grayscale difference between the special effect textures of the two adjacent frames of images by comparison; and determining a value of the similarity between the special effect textures of the two adjacent frames of images based on the grayscale difference value.

In a possible implementation, the condition includes: the value of the similarity between the special effect textures of the two adjacent frames of images is less than a first threshold.

In a possible implementation, the selecting two adjacent frames of images from the plurality of frames of images includes: selecting the first two frames of images from the plurality of frames of images as the two adjacent frames of images.

In a possible implementation, when it is determined that the similarity meets the condition, the apparatus further includes: a sampling module, configured to sample the special effect texture of the latter frame of image in the two adjacent frames of images to a frame buffer, where in the frame buffer, the special effect texture of the latter frame of image in the two adjacent frames of images and a main scene texture of the next frame of image of the two adjacent frames of images are used for rendering to obtain the next frame of image of the two adjacent frames of images.

In a possible implementation, when it is determined that the similarity meets the condition, the apparatus further includes: an instruction interception module, configured to intercept a render instruction that is in the render instructions and that is used to create a render pass to obtain the special effect texture of the next frame of image of the two adjacent frames of images, so that the intercepted instruction is not transferred to an execution object of the render instructions.

In a possible implementation, when it is determined that the similarity does not meet the condition, the apparatus repeatedly performs functions of the texture identification module and subsequent modules. When the texture identification module repeatedly performs the step of selecting two adjacent frames of images from the plurality of frames of images, the latter frame of image in the two adjacent frames of images that are previously selected and the next frame of image of the two adjacent frames of images are used as newly selected two adjacent frames of images.

In a possible implementation, the special effect texture includes at least one of a bloom special effect texture and a shadow special effect texture.

Figure 9:
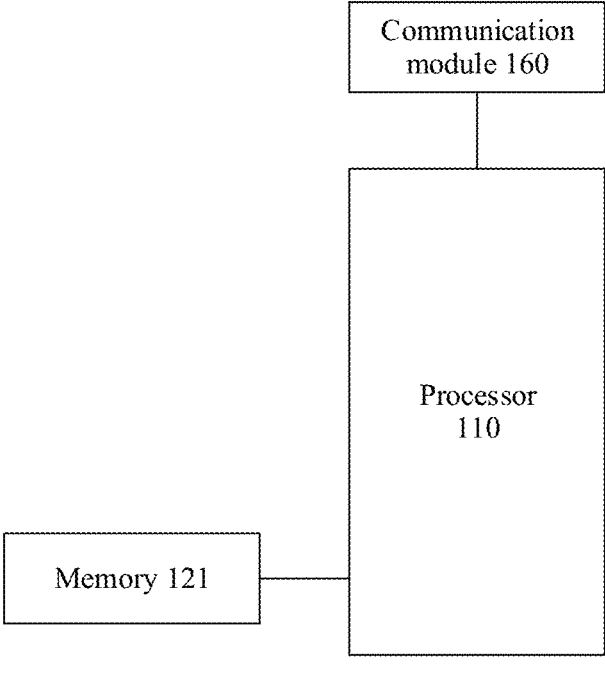
FIG. 9 is a diagram of an example structure of a special effect optimization apparatus according to an embodiment of this application.

FIG. 9 is a diagram of an example structure of a special effect optimization apparatus according to an embodiment of this application.

As shown in FIG. 9, an embodiment of this application provides a special effect optimization apparatus, including a processor and a memory configured to store instructions executable by the processor. The processor is configured to implement the foregoing method when executing the instructions.

The special effect optimization apparatus may be disposed in an electronic device, and may include at least one of a mobile phone, a foldable electronic device, a tablet computer, a desktop computer, a laptop computer, a handheld computer, a notebook computer, a screen speaker, an ultra-mobile personal computer (ultra-mobile personal computer, UMPC), a netbook, an augmented reality (augmented reality, AR) device, a virtual reality (virtual reality, VR) device, an artificial intelligence (artificial intelligence, AI) device, an uncrewed aerial vehicle, a vehicle-mounted device, a smart home device, or a smart city device. A specific type of the special effect optimization apparatus is not specially limited in embodiments of this application.

The special effect optimization apparatus may include a processor 110, an internal memory 121, a communication module 160, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors. For example, the processor 110 may perform Y-diff detection and the like in embodiments of this application, to implement the special effect optimization method in embodiments of this application.

A memory may be further disposed in the processor 110, and is configured to store instructions and data. In some embodiments, the memory in the processor 110 may be a cache. The memory may store instructions or data that are used by the processor 110 or that are used frequently, for example, render instructions and a special effect texture in embodiments of this application. If the processor 110 needs to use the instructions or data again, the processor 110 may directly invoke the instructions or data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, a universal asynchronous receiver/transmitter (universal asynchronous receiver/transmitter, UART) interface, a general-purpose input/output (general-purpose input/output, GPIO) interface, and the like. The processor 110 may be connected to modules such as a wireless communication module, a display, and a camera through at least one of the foregoing interfaces.

The memory 121 may be configured to store computer executable program code. The executable program code includes instructions. The memory 121 may include a program storage area and a data storage area. The program storage area may store an operating system, an application required by at least one function (for example, an application for identifying a purpose of render instructions), and the like. The data storage area may store data (such as a special effect texture) created during use of the special effect optimization apparatus, and the like. In addition, the memory 121 may include a high-speed random access memory, and may further include a non-volatile memory, for example, at least one magnetic disk storage, a flash memory, a universal flash storage (universal flash storage, UFS), or the like. The processor 110 runs the instructions stored in the memory 121 and/or the instructions stored in the memory disposed in the processor, to perform various function methods or data processing of the special effect optimization apparatus.

The communication module 160 may be configured to receive data from another apparatus or device (for example, the application 1001 in this embodiment of this application) in a wired communication or wireless communication manner, or send data to another apparatus or device (for example, the graphics processing unit 1005 in this embodiment of this application). For example, a wireless communication solution that includes a WLAN (for example, a Wi-Fi network), Bluetooth (Bluetooth, BT), a global navigation satellite system (global navigation satellite system, GNSS), frequency modulation (frequency modulation, FM), near field communication (near field communication, NFC), and an infrared technology (infrared, IR) and that is applied to the special effect optimization apparatus may be provided. When the special effect optimization apparatus is connected to another apparatus or device, the communication module 160 may also use a wired communication solution.

It may be understood that the structure shown in this embodiment of this application does not constitute a specific limitation on the special effect optimization apparatus. In some other embodiments of this application, the special effect optimization apparatus may include more or fewer components than those shown in the figure, or some components may be combined, or some components may be split, or there may be a different component layout. The components shown in the figure may be implemented by hardware, software, or a combination of software and hardware.

An embodiment of this application provides a non-volatile computer-readable storage medium. The non-volatile computer-readable storage medium stores computer program instructions. When the computer program instructions are executed by a processor, the foregoing method is implemented.

An embodiment of this application provides a computer program product. The computer program product includes computer-readable code or a non-volatile computer-readable storage medium carrying computer-readable code. When the computer-readable code is run in a processor of an electronic device, the processor in the electronic device performs the foregoing method.

The computer-readable storage medium may be a tangible device that may retain and store instructions for use by an instruction execution device. The computer-readable storage medium may be, for example, but is not limited to, an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (Random Access Memory, RAM), a read-only memory (Read Only Memory, ROM), an erasable programmable read-only memory (Electrically Programmable Read-Only-Memory, EPROM, or flash memory), a static random-access memory (Static Random-Access Memory, SRAM), a portable compact disc read-only memory (Compact Disc Read-Only Memory, CD-ROM), a digital video disc (Digital Video Disc, DVD), a memory stick, a floppy disk, a mechanical coding device, for example, a punch card or a convex structure in a groove that stores instructions, and any suitable combination thereof.

The computer-readable program instructions or code described herein may be downloaded from the computer-readable storage medium to each computing/processing device or to an external computer or external storage device through a network, such as the internet, a local area network, a wide area network, and/or a wireless network. The network may include a copper transmission cable, optical fiber transmission, wireless transmission, a router, a firewall, a switch, a gateway computer and/or an edge server. A network adapter card or a network interface in each computing/processing device receives the computer-readable program instructions from the network, and forwards the computer-readable program instructions for storage into the computer-readable storage medium in each computing/processing device.

The computer program instruction used to perform an operation in this application may be an assembly instruction, an instruction set architecture (Instruction Set Architecture, ISA) instruction, a machine instruction, a machine-related instruction, microcode, a firmware instruction, status setting data, or source code or object code written in any combination of one or more programming languages. The programming languages include an object-oriented programming language such as Smalltalk or C++, and a conventional procedural programming language such as a "C" language or a similar programming language. The program-readable program instructions may be executed entirely on a user computer, partially on the user computer, as an independent software package, partially on the user computer and partially on a remote computer, or entirely on the remote computer or a server. In a case involving a remote computer, the remote computer may be connected to a user computer through any type of network, including a local area network (Local Area Network, LAN) or a wide area network (Wide Area Network, WAN), or may be connected to an external computer (for example, connected through the internet by using an internet service provider). In some embodiments, an electronic circuit, for example, a programmable logic circuit, a field-programmable gate array (Field-Programmable Gate Array, FPGA), or a programmable logic array (Programmable Logic Array, PLA), is customized by using status information of the computer-readable program instructions. The electronic circuit may execute the computer-readable program instructions, to implement various aspects of this application.

The various aspects of this application are described herein with reference to the flowcharts and/or block diagrams of the method, the apparatus (system), and the computer program product according to embodiments of this application. It should be understood that each block of the flowcharts and/or block diagrams and a combination of blocks in the flowcharts and/or block diagrams may be implemented by the computer-readable program instructions.

These computer-readable program instructions may be provided to a processor of a general-purpose computer, a special-purpose computer, or another programmable data processing apparatus to produce a machine, so that the instructions, when executed by the processor of the computer or the another programmable data processing apparatus, create an apparatus for implementing functions/actions specified in one or more blocks in the flowcharts and/or block diagrams. These computer-readable program instructions may alternatively be stored in the computer-readable storage medium. These instructions enable the computer, the programmable data processing apparatus, and/or another device to work in a specific manner. Therefore, the computer-readable medium storing the instructions includes an artifact that includes instructions for implementing the various aspects of the functions/actions specified in the one or more blocks in the flowcharts and/or block diagrams.

The computer-readable program instructions may alternatively be loaded onto the computer, the another programmable data processing apparatus, or another device, so that a series of operation steps is performed on the computer, the another programmable data processing apparatus, or the another device to produce a computer-implemented process. Therefore, the instructions executed on the computer, the another programmable data processing apparatus, or the another device implement the functions/actions specified in the one or more blocks in the flowcharts and/or block diagrams.

The flowcharts and block diagrams in the accompanying drawings show the system architectures, functions, and operations that may be implemented by apparatuses, systems, methods, and computer program products according to various embodiments of this application. In this regard, each block in the flowcharts or block diagrams may represent a module, a program segment, or a part of the instructions, and the module, the program segment, or the part of the instructions includes one or more executable instructions for implementing a specified logical function. In some alternative implementations, functions marked in the blocks may also occur in a sequence different from that marked in the accompanying drawings. For example, two consecutive blocks may be actually executed substantially in parallel, and sometimes may be executed in a reverse order, depending on a function involved.

It should also be noted that each block in the block diagrams and/or the flowcharts, and a combination of blocks in the block diagrams and/or flowcharts may be implemented by hardware (for example, a circuit or an ASIC (Application Specific Integrated Circuit, application specific integrated circuit)) that performs a corresponding function or action, or may be implemented by a combination of hardware and software, for example, firmware.

Although this application is described herein with reference to embodiments, in a process of implementing this application that claims protection, a person skilled in the art may understand and implement another variation of the disclosed embodiments by viewing the accompanying drawings, disclosed content, and the appended claims. In the claims, the word "comprising" (comprising) does not exclude another component or another step, and "a" or "one" does not exclude a case of a plurality of objects. A single processor or another unit may implement several functions enumerated in the claims. Some measures are recorded in dependent claims that are different from each other, but this does not mean that these measures cannot be combined to produce a good effect.

The foregoing has described embodiments of this application. The foregoing descriptions are examples, are not exhaustive, and are not limited to the disclosed embodiments. Without departing from the scope of the illustrated embodiments, many modifications and variations are apparent to a person of ordinary skill in the art. Selection of terms used in this specification is intended to best explain the principles of the embodiments, actual applications, or improvements to technologies in the market, or to enable another person of ordinary skill in the art to understand the embodiments disclosed herein.

The invention claimed is:

1. A method comprising:
obtaining render instructions and identifying a purpose of the render instructions;
in response to the render instructions being used to obtain a plurality of image frames and the plurality of image frames comprising special effect textures:
selecting two adjacent image frames from the plurality of image frames, and
identifying a similarity between special effect textures of the two adjacent image frames; and
in response to the similarity meeting a condition, using a special effect texture of a latter image frame in the two adjacent image frames as a special effect texture of a next image frame of the two adjacent image frames.

2. The method according to claim 1, wherein obtaining the render instructions and identifying the purpose of the render instructions comprises:
intercepting the render instructions from an application;
for each instruction in the render instructions, analyzing at least one of a parameter of the instruction, a type of the instruction, or semantics of an instruction segment in which the instruction is located; and
determining the purpose of the render instructions based on a result of the analysis.

3. The method according to claim 1, wherein identifying the similarity between the special effect textures of the two adjacent image frames comprises:
determining a value of a grayscale difference between the special effect textures of the two adjacent image frames by comparison; and determining a value of the similarity between the special effect textures of the two adjacent image frames based on the value of the grayscale difference.

4. The method according to claim 3, wherein the condition comprises:
the value of the similarity between the special effect textures of the two adjacent image frames is less than a first threshold, wherein a smaller similarity value indicates a greater similarity between the special effect textures of the two adjacent image frames; or
the value of the similarity between the special effect textures of the two adjacent image frames is greater than a second threshold, wherein a smaller similarity value indicates a smaller similarity between the special effect textures of the two adjacent image frames.

5. The method according to claim 1, wherein selecting the two adjacent image frames from the plurality of image frames comprises:
selecting first two image frames from the plurality of image frames as the two adjacent image frames.

6. The method according to claim 1, wherein, in response to the similarity meeting the condition, the method further comprises:
sampling the special effect texture of the latter image frame in the two adjacent image frames to a frame buffer, wherein
in the frame buffer, the special effect texture of the latter image frame in the two adjacent image frames and a main scene texture of the next image frame of the two adjacent image frames are used for rendering to obtain the next image frame of the two adjacent image frames.

7. The method according to claim 1, wherein, in response to the similarity meeting the condition, the method further comprises:
intercepting a render instruction that is in the render instructions and that is used to create a render pass to obtain the special effect texture of the next image frame of the two adjacent image frames, so that the intercepted instruction is not transferred to an execution object of the render instructions.

8. The method according to claim 1, wherein, in response to the similarity not meeting the condition, the method further comprises:
repeatedly performing the steps of selecting the two adjacent image frames from the plurality of image frames, and identifying the similarity between the special effect textures of the two adjacent image frames; and
in response to the step of selecting the two adjacent image frames from the plurality of image frames being repeatedly performed, the latter image frame in the two adjacent image frames that are previously selected and the next image frame of the two adjacent image frames are used as newly selected two adjacent image frames.

9. The method according to claim 1, wherein the special effect texture comprises at least one of a bloom special effect texture or a shadow special effect texture.

10. An apparatus comprising:
a processor; and
a memory with instructions stored thereon, wherein the instructions, when executed by the processor, enable the apparatus to:
in response to render instructions being used to obtain a plurality of image frames and the plurality of image frames comprising special effect textures:
select two adjacent image frames from the plurality of image frames, and identify a similarity between special effect textures of the two adjacent image frames; and in response to the similarity meeting a condition, use a special effect texture of a latter image frame in the two adjacent image frames as a special effect texture of a next image frame of the two adjacent image frames.

11. The apparatus according to claim 10, wherein the instructions, when executed by the processor, further enable the apparatus to:

intercept the render instructions from an application;

for each instruction in the render instructions, analyze at least one of a parameter of the instruction, a type of the instruction, or semantics of an instruction segment in which the instruction is located; and determine a purpose of the render instructions based on a result of the analysis.

12. The apparatus according to claim 10, wherein identifying the similarity between the special effect textures of the two adjacent image frames comprises:

determining a value of a grayscale difference between the special effect textures of the two adjacent image frames by comparison; and determining a value of the similarity between the special effect textures of the two adjacent image frames based on the value of the grayscale difference.

13. The apparatus according to claim 12, wherein the condition comprises:

the value of the similarity between the special effect textures of the two adjacent image frames is less than a first threshold, wherein a smaller similarity value indicates a greater similarity between the special effect textures of the two adjacent image frames; or the value of the similarity between the special effect textures of the two adjacent image frames is greater than a second threshold, wherein a smaller similarity value indicates a smaller similarity between the special effect textures of the two adjacent image frames.

14. The apparatus according to claim 10, wherein selecting the two adjacent image frames from the plurality of image frames comprises:

selecting a first two image frames from the plurality of image frames as the two adjacent image frames.

15. The apparatus according to claim 10, wherein the instructions, when executed by the processor, further enable the apparatus to, in response to the similarity meeting the condition:

sample the special effect texture of the latter image frame in the two adjacent image frames to a frame buffer, wherein in the frame buffer, the special effect texture of the latter image frame in the two adjacent image frames and a main scene texture of the next image frame of the two adjacent image frames are used for rendering to obtain the next image frame of the two adjacent image frames.

16. The apparatus according to claim 10, wherein the instructions, when executed by the processor, further enable the apparatus to, in response to the similarity meeting the condition:

intercept a render instruction that is in the render instructions and that is used to create a render pass to obtain the special effect texture of the next image frame of the two adjacent image frames, so that the intercepted instruction is not transferred to an execution object of the render instructions.

17. The apparatus according to claim 10, wherein the instructions, when executed by the processor, further enable the apparatus to, in response to the similarity not meeting the condition:

repeatedly perform the step of selecting the two adjacent image frames from the plurality of image frames and identifying the similarity between the special effect textures of the two adjacent image frames; and in response to the step of selecting the two adjacent image frames from the plurality of image frames being repeatedly performed, the latter image frame in the two adjacent image frames that are previously selected and the next image frame of the two adjacent image frames are used as newly selected two adjacent image frames.

18. The apparatus according to claim 10, wherein the special effect texture comprises at least one of a bloom special effect texture or a shadow special effect texture.

19. A non-volatile computer-readable storage medium storing computer program instructions, wherein, when the computer program instructions are executed by a processor, the processor is configured to:

in response to render instructions being used to obtain a plurality of image frames and the plurality of image frames comprising special effect textures:

select two adjacent image frames from the plurality of image frames, and identify a similarity between special effect textures of the two adjacent image frames; and in response to the similarity meeting a condition, use a special effect texture of a latter image frame in the two adjacent image frames as a special effect texture of a next image frame of the two adjacent image frames, wherein the condition comprises a value of the similarity between the special effect textures of the two adjacent image frames being greater than a threshold, and a smaller similarity value indicates a smaller similarity between the special effect textures of the two adjacent image frames.

\* \* \* \* \*